Figure 8:
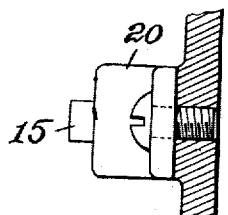

No. 865,970. PATENTED SEPT. 10, 1907.
C. S. LEE.
CONTROLLER FOR ELECTRIC MOTORS.
APPLICATION FILED JUNE 4, 1906.
3 SHEETS—SHEET 1.
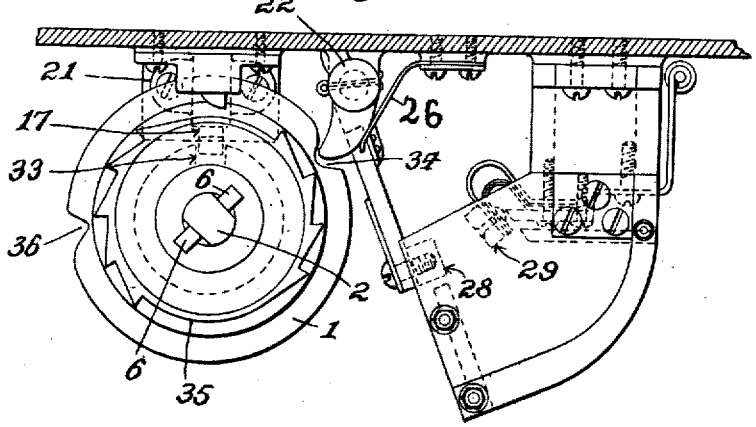
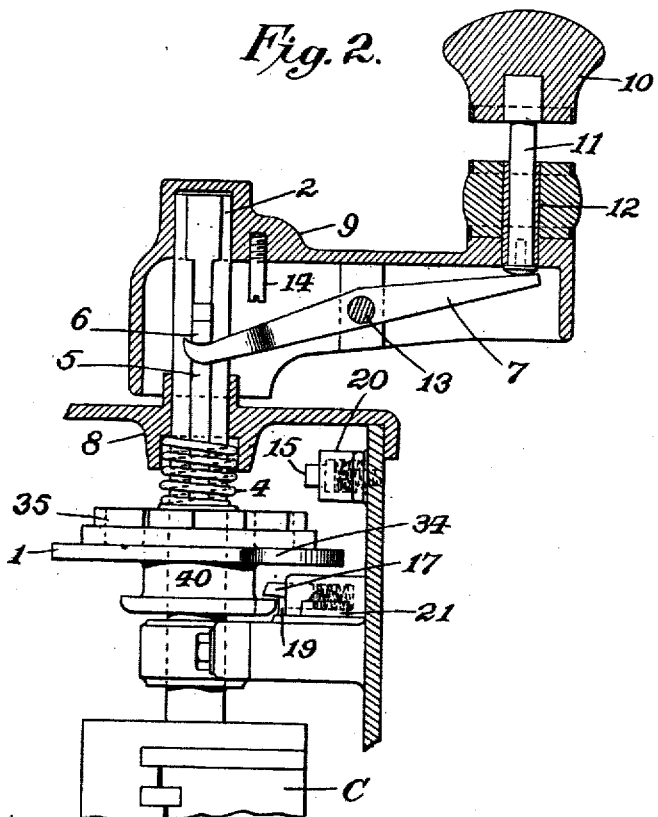
Attest:
Inventor:
Charles S. Lee
by Howson and Howson Attys.

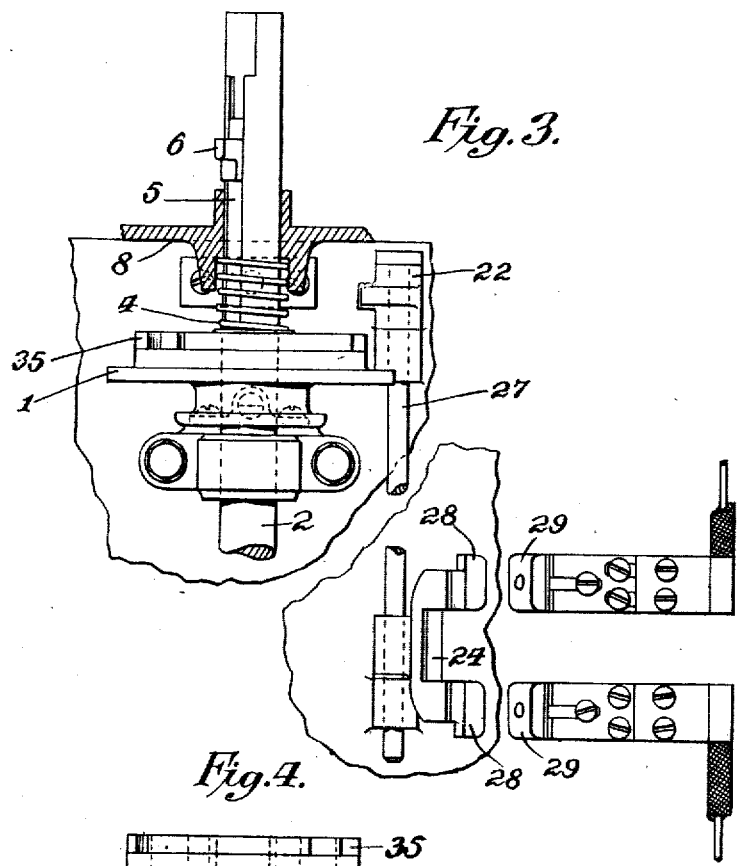
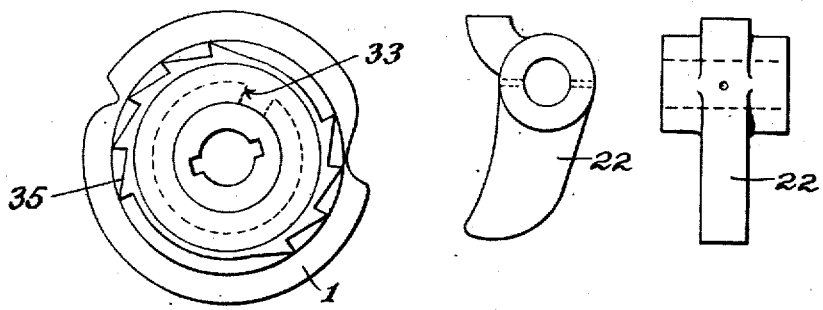

No. 865,970.  
PATENTED SEPT. 10, 1907.  
C. S. LEE.  
CONTROLLER FOR ELECTRIC MOTORS.  
APPLICATION FILED JUNE 4, 1906.

3 SHEETS—SHEET 3.

Attest:  
Edgeworth Greene  
William Abbe

Inventor:  
Charles S. Lee  
by Howson and Howson  
Attys.

UNITED STATES PATENT OFFICE.

CHARLES S. LEE, OF TROY, NEW YORK.

CONTROLLER FOR ELECTRIC MOTORS.

No. 865,970.  Specification of Letters Patent.  Patented Sept. 10, 1907.

Application filed June 4, 1906. Serial No. 320,128.

*To all whom it may concern:*

Be it known that I, CHARLES S. LEE, a citizen of the United States of America, residing in the city of Troy, in the county of Rensselaer, State of New York, have invented certain new and useful Improvements in Controllers for Electric Motors, of which the following is a full, clear, and exact specification.

One of the main objects of my invention is to so construct a controller for electric motors as to do away with the ordinary forms of magnetic blow-out employed in connection with the contact cylinders. I so construct my controller that it is sparkless during the act of shutting off the power, or at any other point during the rotation of the cylinder, that it is imperative for the operator to successively engage the contacts on the controller in order to operate the same, and further it is impossible to turn back the controller cylinder from any point without first shutting off the power, and finally I accomplish these things by simple, efficient, and reliable means.

In carrying out this invention, I provide a switch or circuit breaker of an ordinary automatic construction and provided or not with a magnetic circuit breaker as may be desired, and this switch I place between the source of power and the ordinary controller contacts, providing a counter shaft for a movable contact member of the circuit breaker which is operated from a lever, the end of which is actuated and regulated in position by a certain notched cam operatively connected to the controller shaft. In order to prevent sparking of the controller in turning to "off" position, I provide a ratchet for the shaft, the pawl of which will engage to prevent counter clockwise rotation of the shaft, when said circuit breaker is closed by said cam, but when said cam allows said circuit breaker to open, then the ratchet will be out of engagement with its pawl, when the cylinder can be turned to "off" position without sparking. To make it imperative that the operator successively pass from the "off" position to each contact point, I provide a regulating disk or flange with a notch so located as to prevent the engagement of the cam with its lever unless said engagement is effected at the start or "off" position, and thereafter continuously maintained; thus, successfully providing an automatic cut-out should the operator leave his controller lever.

Figure 9:
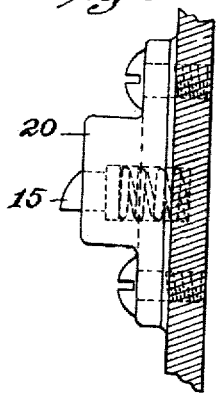
Figure 10:
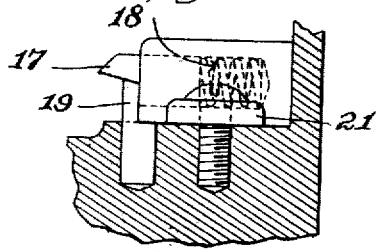
Figure 11:
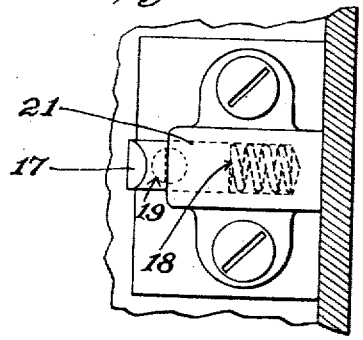
Figure 12:
Figure 13:
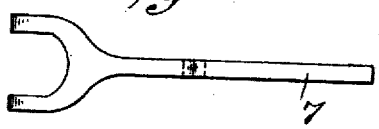
Figure 14:
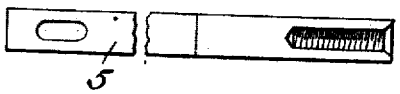
Figure 15:
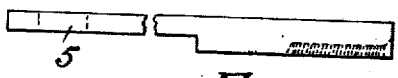
Figure 16:
Figure 17:
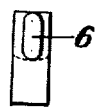

In the accompanying drawings I have illustrated a preferred embodiment of my invention, in which:

Figure 1 is a plan of the circuit breaker and its controlling mechanism with the controller handle removed; Fig. 2 is a side elevation partly in section of the controller handle, shaft, and controlling mechanism; Fig. 3 is a front elevation of the mechanism shown in Fig. 1; Fig. 4 is a plan of a compound element comprising a ratchet cam and notched hub; Fig. 5 is a side elevation of Fig. 4; Fig. 6 is a plan, and Fig. 7 a side elevation of the switch operating rocker arm; Fig. 8 is a side elevation, and Fig. 9 a plan of the pawl; Fig. 10 is a side elevation, and Fig. 11 a plan of the latch; Fig. 12 is a side elevation, and Fig. 13 is a plan of the lever for shifting the compound element; Fig. 14 is a plan, and Fig. 15 is a side elevation of one of the keys; Fig. 16 is a side elevation, and Fig. 17 an elevation of the inner face of one of the lugs which fit the keys.

As shown in the drawings, 2 is the main controller shaft which carries the controller cylinder C (see Figs. 2 and 3) which may be of the usual construction. The sides of the shaft 2 are notched or longitudinally slabbed as shown in Fig. 3 to accommodate two keys 5 (see Figs. 14 and 15), and they have extended lugs 6 each securely fitted into an opening in the end of a key. These lugs form shoulders underneath which the forked end of the auxiliary lever 7 may abut. The auxiliary lever 7 is pivoted at 13 to the hollow main controller arm 9 secured to the end of the shaft 2 by a set screw, or otherwise.

An adjustable screw 14 secured to the arm 9 serves as a stop to limit the motion of one end of the lever 7, while a vertically movable knob or handle 10 on a stem 11 passing through a vertical bearing 12 on the end of the arm 9 bears upon the other end of said lever 7. The lower ends of the keys 6 are firmly secured to a compound element (See Figs. 4 and 5) slidable on the shaft and downwardly forced upon the same by a coiled spring 4 between the controller box cover 8 and said element. This element is composed of three distinct but related instrumentalities made in a single piece. The upper is a ratchet wheel 35, surmounting a cam disk 1 of greater diameter having, as herein shown for series-parallel control, two notches 34 and 36. Below the disk 1 is a flange having a notch 33 hereafter referred to as contact permitting notch.

In the position shown in Fig. 2 the compound element is free from all pawls; levers and detents and the controller may be rotated indefinitely without making contact at the circuit breaker unless the handle or knob 10 be depressed when the contact-permitting notch 33 is opposite a latch 17 carried in a bracket 21 and outwardly pushed by a spring 18. The latch has a slabbed upper edge so that it may be retracted upon application of pressure vertically upon its nose from above but has a horizontal lower shoulder adapted to prevent the passage upward of the flange having the notch 33 unless such notch in normal position is opposite the latch. A thrust post 19 may be provided to take the force of the impact of the compound element on the nose of the latch. A second bracket 20 above the compound element has a pawl 15 in the plane occupied by the ratchet wheel when raised to the limit by the knob 10, when it will prevent counter clockwise motion of the shaft 2. When in such raised position the cam 1 will be on the plane of the nose at the end of a lever or rocker arm 22 which is fixed to a counter shaft 27. The counter shaft 27 carries an insulated contact arm 24, on the end of which is secured a contact block 28. A spring 26 bearing against the ratchet arm tends always to force said contact 28 away from the stationary contacts 29 which may be connected with the source of power.

In proper operation with the parts in normal positions shown in these figures, the operator will first depress the knob 10, and thereby oscillate the lever 7, raise the keys and the compound element to their limit causing the notch 33 to pass to above the latch 17, placing the pawl 15 in position to prevent backward rotation so soon as the first left hand tooth shall have passed it and what is most important, placing the nose of the rocker arm 22 in the notch 34. Upon rotating the controller arm clockwise with the knob still depressed, the nose of the rocker arm will be caused to ride up onto the periphery of the cam to rotate the counter shaft and make contact at the circuit breaker, thereby causing current to be delivered in the usual way to the controller segments and brushes. Upon continued rotation in a series parallel controller as one goes into parallel from series, the notch 36 will come opposite the nose and momentarily break the circuit at the circuit breaker according to best practice.

Should the operator at any time wish to turn off power he releases the knob 10, allowing the compound element to fall into the position shown, which has the effect of allowing the rocker arm to move to break the circuit and also to free the ratchet from the pawl, so that the main controller arm may be turned back to normal position.

The operator can do no damage either in turning the current on or off or after doing the same, for he must always return to normal position, except when going ahead successively, or when staying in a given notch. He cannot move his main controller arm to close his circuit breaker without depressing the knob 10 when in normal position for at no other position will the detent allow the flange of the compound element to pass it, and unless raised no operation of the circuit breaker can be effected. He cannot turn back when power is on, for the ratchet prevents. He cannot remove his hand from the knob 10 without letting the element fall, thus breaking the circuit as hereinbefore described.

It will be noted as of great electrical importance that no return motion of the controller from any point after starting may take place without first breaking the circuit at the circuit breaker. It will be obvious that such feature renders the parts electrically without potential and will thus do away with arcing without the use of blow-outs at the cylinder contacts.

I am aware that it has heretofore been proposed to break circuit with circuit breaker controlled by the operating lever when going from one contact to another in which two different motions are given to the operating means, but such I do not claim.

What I claim as my invention is:

1. A controller shaft, a circuit breaker and means operated from the movable portions of the controller for controlling the operation of the circuit breaker, and means to compel the operator to close the circuit at the controller contacts successively after closing the circuit at the circuit breaker.
2. A controller shaft, a circuit breaker and means operated from the movable portions of the controller for controlling the operation of the circuit breaker, and means to compel the operator to close the circuit at the controller contacts successively after closing the circuit at the circuit breaker, in combination with means adapted to prevent the turning to "off" position of the controller until the circuit has been broken at the circuit breaker.

3. A controller shaft, a circuit breaker and means operated from the movable portions of the controller for controlling the operation of the circuit breaker, and means to compel the operator to close the circuit at the controller contacts successively after closing the circuit at the circuit breaker, in combination with automatic means to break the circuit at the circuit breaker upon the release of the controller handle by operator.

4. A controller shaft, a circuit breaker and means operated from the movable portions of the controller for controlling the operation of the circuit breaker, and means to compel the operator to close the circuit at the controller contacts successively after closing the circuit at the circuit breaker, in combination with means adapted to prevent the turning to "off" position of the controller until the circuit has been broken at the circuit breaker, and automatic means to break the circuit at the circuit breaker upon the release of the controller handle by operator.

5. The shaft of a controller, a cam operatively connected thereto, a circuit breaker, a controlling means therefor operated from said cam, and an operating device having two motions, one motion adapted to rotate the controller cylinder, the other motion adapted to actuate said cam to place it into position to control the circuit breaker, in combination with means to prevent the turning to "off" position until after the circuit is broken at the circuit breaker.

6. The shaft of a controller, a cam operatively connected thereto, a circuit breaker, a controlling means therefor operated from said cam, and an operating device having two motions, one motion adapted to rotate the controller cylinder, the other motion adapted to actuate said cam to place it into position to control the circuit breaker, in combination with means to prevent such shifting except from normal position and means to prevent the turning to "off" position until after the circuit is broken at the circuit breaker.

7. The shaft of a controller, a cam operatively connected thereto, a circuit breaker, a controlling means therefor operated from said cam, and an operating device having two motions, one motion adapted to rotate the controller cylinder, the other motion adapted to actuate said cam to place it into position to control the circuit breaker, in combination with means to automatically break said circuit upon release of controller handle and means to prevent the turning to "off" position until after the circuit is broken at the circuit breaker.

8. The shaft of a controller, a cam operatively connected thereto, a circuit breaker, a controlling means therefor operated from said cam, and an operating device having two motions, one motion adapted to rotate the controller cylinder, the other motion adapted to actuate said cam, to place it into position to control the circuit breaker, in combination with means to prevent such shifting except from normal position, means to automatically break said circuit upon release of controller handle, and means to prevent the turning to "off" position until after the circuit is broken at the circuit breaker.
9. A device of the kind specified, comprising a rotating controller arm, an operating handle carried thereby, a controller shaft, a notched cam slidable thereon, a circuit breaker, an operating arm therefor controlled by said cam, when said operating handle is actuated, and a ratchet and pawl to prevent return movement of said shaft when circuit breaker is closed.

10. A device of the kind specified, comprising a rotating controller arm, an operating handle carried thereby, a controller shaft, a notched cam slidable thereon, a circuit breaker, an operating arm therefor controlled by said cam, when said operating handle is actuated, and a notched flange adapted to prevent the slide of the cam except when in normal position.

11. A device of the kind specified, comprising a rotating controller arm, an operating handle carried thereby, a controller shaft, a notched cam slidable thereon, a circuit breaker, an operating arm therefor controlled by said cam, when said operating handle is actuated, a ratchet and pawl to prevent return movement of said shaft when circuit breaker is closed and a notched flange adapted to prevent the slide of the cam except when in normal position.

12. A main controller shaft, a counter shaft, a circuit breaker, operated from said main shaft, a notched cam slidable on said controller shaft, keys for sliding said cam, a rotary handle on the controller shaft, a depressible handle carried by said rotary handle and a lever connecting it with said keys, and a rocker arm operated from said notched cam.

13. A main controller shaft, a counter shaft, a circuit breaker operated from said main shaft, a notched cam slidable on said controller shaft, keys for sliding said cam, a rotary handle on the controller shaft, a depressible handle carried by said rotary handle and a lever connecting it with said keys, a rocker arm operated from said notched cam, and a ratchet movable with the cam and a pawl to limit its rotation when said cam engages said rocker arm.

14. A main controller shaft, a counter shaft, a circuit breaker operated from said main shaft, a notched cam slidable on said controller shaft, keys for sliding said cam, a rotary handle on the controller shaft, a depressible handle carried by said rotary handle and a lever connecting it with said keys, a rocker arm operated from said notched cam, a flange slidable with said cam having a notch, and a latch adapted to prevent the upward movement of said flange when said notch is not in register therewith.

15. A main controller shaft, a counter shaft, a circuit breaker operated from said main shaft, a notched cam slidable on said controller shaft, keys for sliding said cam, a rotary handle on the controller shaft, a depressible handle carried by said rotary handle and a lever connecting it with said keys, a rocker arm operated from said notched cam, a ratchet movable with the cam and a pawl to limit its rotation when said cam engages said rocker arm, a flange slidable with said cam having a notch, and a latch adapted to prevent the upward movement of said flange when said notch is not in register therewith.

16. A main controller shaft, a counter shaft, a circuit breaker operated from said main shaft, a notched cam slidable on said controller shaft, keys for sliding said cam, a rotary handle on the controller shaft, a depressible handle carried by said rotary handle and a lever connecting it with said keys, a rocker arm operated from said notched cam, a flange slidable with said cam having a notch, a latch operated to prevent the upward movement of said flange when said notch is not in register therewith, and means to permit the downward movement of the flange and cam at all times.

In testimony whereof I have signed my name to this specification, in the presence of two subscribing witnesses.

CHARLES S. LEE.

Witnesses:
WM. B. WILSON,
ROBERT B. WATERS.